(12) United States Patent
Strand

(10) Patent No.: US 6,226,341 B1
(45) Date of Patent: May 1, 2001

(54) SAFETY DEVICE FOR A NEUTRONIC REACTOR

(75) Inventor: Albert T. Strand, Aiken, SC (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 03/413,735

(22) Filed: Mar. 2, 1954

(51) Int. Cl.[7] .................................................... G21C 7/22

(52) U.S. Cl. .............................................. 376/338; 376/327

(58) Field of Search ......................... 204/154.2; 376/337, 376/338, 327

(56) References Cited

U.S. PATENT DOCUMENTS

| | | | |
|---|---|---|---|
| 2,708,656 | * | 5/1955 | Fermi et al. .......................... 204/193 |
| 2,735,811 | * | 2/1956 | Weinberg et al. ................. 204/154.2 |

OTHER PUBLICATIONS

A.E.C.D. 3065, "High Power Water Boiler", pp 10–13, 17–19, Feb. 27. 1951.*

* cited by examiner

Primary Examiner—Harvey E. Behrend
(74) Attorney, Agent, or Firm—Robert J. Fisher; William R. Moser; Paul A. Gottlieb

(57) ABSTRACT

A neutronic reactor comprising an active portion containing material fissionable by neutrons of thermal energy, means to control a neutronic chain reaction within the reactor comprising a safety device and a regulating device, a safety device including means defining a vertical channel extending into the reactor from an aperture in the upper surface of the reactor, a rod containing neutron-absorbing materials slidably disposed within the channel, means for maintaining the safety rod in a withdrawn position relative to the active portion of the reactor including means for releasing said rod on actuation thereof, a hopper mounted above the active portion of the reactor having a door disposed at the bottom of the hopper opening into the vertical channel, a plurality of bodies of neutron-absorbing materials disposed within the hopper, and means responsive to the failure of the safety rod on actuation thereof to enter the active portion of the reactor for opening the door in the hopper.

8 Claims, 7 Drawing Sheets

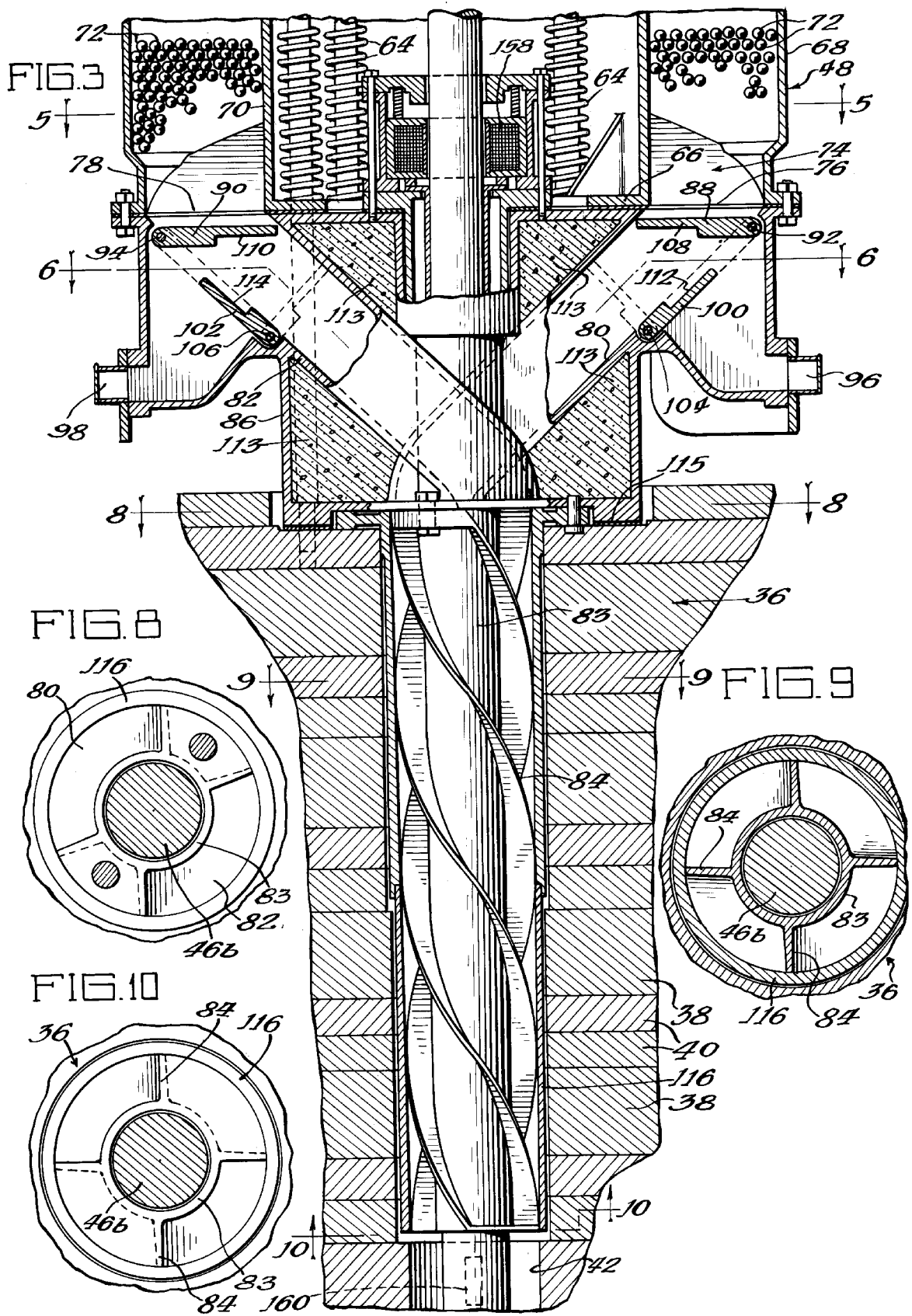

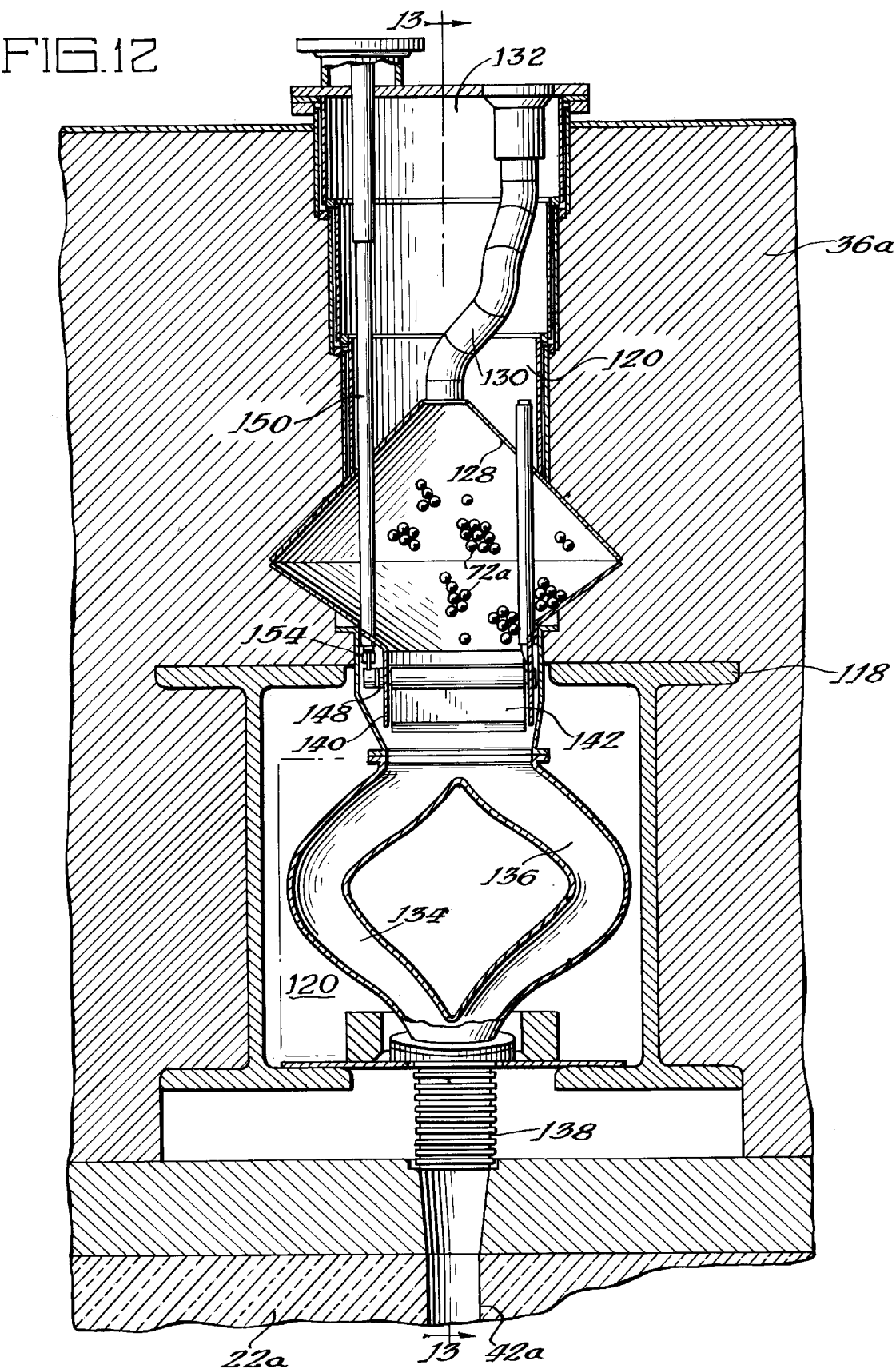

SAFETY DEVICE FOR A NEUTRONIC REACTOR

This invention relates generally to neutronic reactors, and more specifically to devices for preventing neutronic chain reactions from exceeding safe operating limits.

All neutronic reactors are constructed with as much excess reactivity as is possible considering the available reactor control system, the excess reactivity of a neutronic reactor being defined as the amount that the reproduction ratio of a neutronic reactor under most favorable conditions exceeds unity. The reproduction ratio of a neutronic reactor is the ratio of the number of neutrons in any given generation to the number of neutrons in the preceding generation within the actual pile structure. The excess reactivity of a neutronic reactor determines the magnitude of isotope production and other neutron-absorbing activities which the reactor may accomplish, and also determines the flexibility which is possible in operating the reactor.

The existence of excess reactivity in a reactor makes desirable both regulating control means and safety control means for the reactor. Regulating control means are necessary in order to maintain the reproduction ratio of the reactor at unity during constant power operation, and to make adjustments in the power level of the reactor. Safety control means are desirable in order to shut down the reactor more rapidly when unsafe operating conditions develop than is possible with the regulating control means.

There are many causes of unsafe operating conditions which make it desirable to shut down a neutronic reactor. If the reactor "period" becomes too short for any reason, it is desirable to shut down the reactor, the reactor period being the time required for the neutron flux density within the reactor to increase by a factor of e, or 2.718. In those reactors which employ cooling means and operate at substantial power levels, it is also desirable to shut down the reaction if there is a decrease in the flow of the coolant. There are also many other reasons for providing a safety control system to shut down a neutronic reactor, and the safety control system may be coupled to any of these dangerous conditions.

A number of safety control systems have been developed in the neutronic reactor art. In one of these systems, neutron-absorbing rods are disposed within channels which extend into the active portion of the reactor, the active portion being the region of the reactor in which the fissionable material is disposed. The rods of neutron-absorbing materials are mechanically biased to enter the active portion of the reactor when released, either by the attraction of gravity or some impelling force.

Another safety system provides a channel extending through the active portion of the reactor and means to impel bodies of neutron-absorbing material into the channel in response to an unsafe condition. The application of John J. Goett, Ser. No. 595,189, entitled "Reactor Control", filed May 22, 1945, now U.S. Pat. No. 2,773,823, discloses such a system provided with a centrifugal impeller for driving balls of neutron-absorbing materials into a reactor.

It has been found that neither of these systems is entirely satisfactory. Both of the systems are complicated by the fact that it is desirable to keep the ambient atmosphere from the active portion of the reactor to as great an extent as possible, since both nitrogen and oxygen present in the ambient atmosphere have relatively large neutron capture cross-sections. For this reason, it is generally necessary to provide liners for all channels entering into the active portion of the reactor, and to seal the channels from the atmosphere within the reactor. It is also to be noted, that the liners themselves introduce added neutron losses into the reactor.

Considerations of neutron economy also dictate that the channels extending into the active portion of the reactor be confined to as small a cross-section as possible. As a result, the rod safety system permits relatively small clearance between the rods and the rod liners, and hence it is possible for some of the rods to jam within the channels in the reactor before the rod is effectively inserted into the active portion of the reactor. The problem of jamming is further complicated in neutronic reactors which use graphite or other solid crystalline moderator structures by the fact that distortion of the solid moderator structure results from the bombardment of the structure by the high energy neutrons which are present in neutronic chain reactions. The shifting of graphite blocks in reactors employing moderators thus constructed, may so distort the channels for the safety control devices, that rods could not be made to enter into the active portion of the reactor effectively, hence causing the entire safety system to fail.

The rod type of safety system, however, has some distinct advantages over other types of control, such as the impelled ball system described above. A rod may readily by recovered from its channel in the active portion of the reactor, whereas it is difficult to remove neutron-absorbing balls from the channels extending through the active portion of the reactor, both as a mechanical problem and as a health physics problem, since the neutron-absorbing balls will remain highly radio-active even after the neutronic reaction has ceased. Hence, it is an object of the present invention to provide a safety system for a neutronic reactor which is both neutronically safe and physically convenient.

Another object of the present invention is to provide a safety system which provides two separate safety operations, the failure of one operation actuating the second operation, thereby greatly reducing the probability of a failure of the safety system.

Further, it is an object of the present invention to accomplish the provision of a safety system having two separate operations without introducing into the neutronic reactor additional neutron-absorbing materials or additional neutronically deleterious channels.

Further objects and advantages of the present invention will be readily apparent to the man skilled in the art from a further reading of this specification, particularly when viewed in the light of the drawings, in which:

FIG. 3 is a vertical sectional view of the portion of the safety system shown in FIGS. 1 and 2;

FIG. 8 is a sectional view taken along line 8—8 of FIG. 3;

FIG. 9 is a sectional view taken along line 9—9 of FIG. 3;

FIG. 10 is a sectional view taken along line 10—10 of FIG. 3;

FIG. 12 is a vertical sectional view of another form of the invention illustrated as constructed in the shield of reactor shown in FIG. 1;

Figure 1:
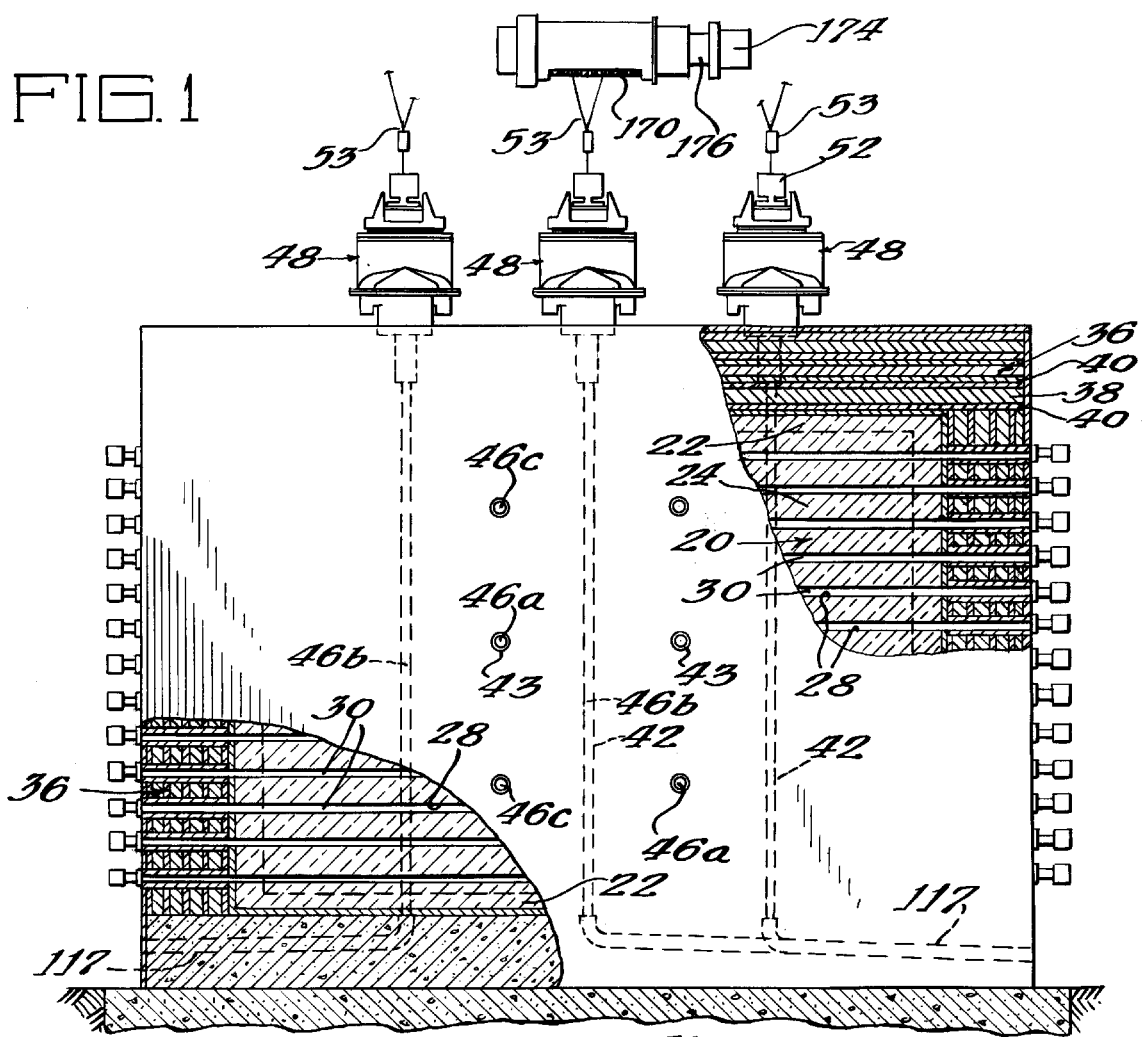
FIG. 1 is an elevational view, partly in section, of a neutronic reactor provided with a safety control system embodying the teachings of the present invention.

While the present invention is suitable for use on any type of neutronic reactor, it will be illustrated in combination with a natural-uranium graphite-moderated reactor in which the fission-producing neutrons are primarily of thermal energy. The details of the reactor which is to be illustrated and of the auxiliary equipment required to operate the reactor are shown in detail in the patent application of Enrico Fermi and Leo Szilard, entitled "Chain Reactions", filed Dec. 19, 1994, Ser. No. 568,904 now U.S. Pat. No. 2,708,656, particularly the embodiment shown principally in FIGS. 37 through 42 and the descriptive matter thereto. The details of another reactor of the same type are disclosed in the patent application of Eugene P. Wigner, Alvin M. Weinberg, and Gale J. Young, Ser. No. 613,154, entitled "Reactors", filed Aug. 28, 1945, particularly the embodiment described in FIGS. 15 through 17.

As stated above, the present invention is suitable for use in reactors which contain fuel consisting solely of $U^{235}$, or $Pu^{239}$, as well as natural uranium. For an example of a reactor using $U^{235}$ as fuel, reference is made to the co-pending application of Hugh B. Steward, Ser. No. 366,621, filed Jul. 7, 1953.

The reactor illustrated in the figures has an active portion 20 which may be defined as the region of the reactor containing the fissionable material. The active portion 20 is disposed within a reflector 22, and comprises a cube 24 of graphite which serves as a moderator, and a plurality of fuel elements 26 disposed within the cube 24. Channels 28 extend horizontally through the cube 24 parallel to each other, and tubes 30 are disposed within the channels 28. The fuel elements 26 are disposed within the tubes 30 on ribs 32 which are provided on the interior surface of the tubes 30. The fuel elements 26 are provided with corrosion resistant jackets 34, and the annulus 35 between the jackets 34 of the fuel elements 26 and the tubes 30 contains water which is pressurized and circulated to remove heat of the neutronic reaction from the reactor.

The reflector 22 is also constructed of graphite and is in the form of a hollow cube which surrounds the cube 24. In order to indicate the reflector 22 on FIG. 1, a dotted line has been used to separate it from the active portion 20. It is to be noted that the cube 24 effectively defines the active portion 20 of the reactor.

A shield 36 surrounds the reflector 22, and it is constructed of a plurality of layers 38 and 40. The layers 38 are constructed of iron, and the layers 40 are constructed of masonite, the layers 38 and 40 alternating throughout the shield 36 as taught in the patent application of Eugene P. Wigner and Gale J. Young, entitled "Shield", Ser. No. 595,184, filed May 22, 1945.

The reactor is provided with vertical channels 42 and horizontal channels 43. Neutron-absorbing rods 46a and 46b are slidably disposed within the channels 42 and 43, and are used to control the neutronic chain reaction. The rods 46a are used as regulating control elements and are translatable in the horizontal channels 43, while other rods 46b are used as safety control elements and are translatable in the vertical channels 42. Regulating elements are positioned within the reactor to maintain the reproduction ratio of the reactor at unity when a constant power level is desired, or positioned to change the power level. Safety elements are withdrawn from the active portion of a reactor and maintained in stand-by condition during operation of the reactor, so that they may be rapidly inserted into the reactor to shut down the reaction in the event an unsafe condition develops, or in the event it is desired to shut down the reaction rapidly for some other reason. A third type of control element called a shim control element is often provided in order to restrict the reactor excess reactivity to a value which may be controlled by the regulating rods in the normal course of operation, and is illustrated as a translatable horizontal rod 46c in FIG. 1.

Considering first the embodiment of the invention shown in FIGS. 1 through 11, hoppers 48 are disposed about safety rods 46b immediately exterior to the reactor shield 36. A sleeve 50 is closely fitted to the exterior surface of the rod 46b and forms a gas barrier between the active portion 20 of the reactor and the ambient atmosphere.

Figure 4:
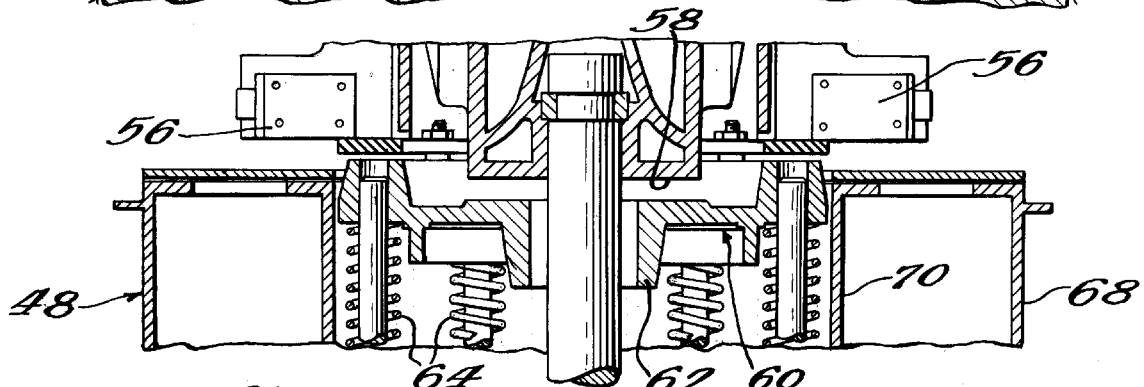
FIG. 4 is a vertical sectional view of another portion of the safety system shown in FIG. 3.
Figure 11:
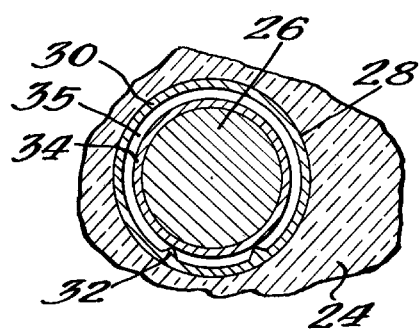
FIG. 11 is an enlarged sectional view of one of the tubes traversing the reactor shown in FIG. 1.

The upper end of the rod 46b is provided with a connector 52 which is connected to a cable 53 or some other means for positioning the safety rod 46b. The connector 52 is also provided with a member 54 which contacts the actuating members 55 of a pair of limit switches 56 which remove the power from the rod positioning mechanism when the rod 46b achieves this position. As shown in FIG. 4, the lower portion of the connector 52 has a surface 58 which strikes against a shock-absorbing mechanism 60 when the rod 46b is permitted to drop into the active portion 20 of the reactor. The mechanism 60 has a frame 62 supported by springs 64 which extend between the frame 62 and a base 66, illustrated in FIGS. 3 and 4.

Each hopper 48 is essentially cylindrical in cross-section having an outer wall 68 and an inner wall of smaller radius 70. A portion of the region between the outer wall 68 and the inner wall 70 contains relatively small balls 72 of neutron-absorbing material.

The region between the outer and inner walls 68 and 70 of the hopper 48 is provided with a floor 74 which slopes downwardly in both directions from a line 75 traversing the cylindrical walls 68 and 70 through the axis of the hopper 48. Apertures 76 and 78 are provided in the floor 74 at the lowest points thereof, so that the balls 72 may be conveyed by gravitational attraction from the region between the outer wall 68 and the inner wall 70. A pair of chutes 80 and 82 extend from the apertures 76 and 78 inwardly toward the channel 42 of the reactor. These chutes 80 and 82 terminate on opposite sides of the safety rod 46b. A sleeve 83 is attached to the hopper 48 and extends about the rod 46b through the shield 36. The sleeve 83 is provided with spiral fins 84 which spiral downwardly into the channel 42 of the reactor. The inner wall 70 extends below the outer wall 68 to form a housing 86 which is disposed between the reactor and the hopper 48. The housing 86 also encloses the two chutes 80 and 82 and forms an air-tight seal between the reactor and the hopper 48. Trap doors 88 and 90 are mounted upon pins 92 and 94 adjacent to the apertures 76 and 78, and the doors 88 and 90 may be opened by rotation of the pins 92 and 94, thereby permitting the balls 72 to tumble down the chutes 80 and 82 into the spirally grooved channel. The housing 86 is also provided with a pair of outlets 96 and 98 on opposite sides thereof which are connected into the chutes 80 and 82. A second pair of rotatable doors 100 and 102 are mounted upon pins 104 and 106 at the junction of the outlets 96 and 98 and the chutes 80 and 82. The rotatable doors 100 and 102 are shaped to close the chutes 80 and 82 when rotated to a position within the chutes, shown in dotted lines in FIG. 3, and to cover approximately two-thirds of the opening to the outlets 96 and 98 when rotated to the position shown in solid lines. in FIG. 3. The rotatable doors 88 and 90 are provided with recesses 108 and 110 which are aligned with recesses 112 and 114 in the rotatable doors 100 and 102, so that rotation of the doors 88 and 90 to the open position aligns these doors with doors 100 and 102 when the latter doors are positioned out of the chutes 80 and 82 and partially close the outlets 96 and 98.

Since radiation may escape through the shield 36 of the reactor by means of the channel 42, the voids in the housing 86 have been filled with shielding materials 113, such as concrete. Also, the balls 72 of neutron-absorbing material aid in reducing the amount of radiation escaping from the active portion 20 of the reactor through the channel 42. In this connection, it is necessary to seal the atmosphere within the reactor from the ambient atmosphere, since bombardment of the materials in the reactor and the reactor atmosphere produce radioactive isotopes which would constitute a health hazard if permitted to escape to the ambient atmosphere. For these reasons, seals between the housing 86 and the reactor shield 36, designated 115, are provided, and the housing itself seals the regions between the inner wall 70 and the outer wall 68 from the ambient atmosphere.

A protective sleeve 116 surrounds the spiral fins 84 of the sleeve 83 in abutting relationship and protects the shield 36 from any abrasive action of the balls 72 as they travel into the channel 42.

The operation of the safety mechanism may be described assuming the doors 88, 90, 100, and 102 are in the positions shown by solid lines in FIG. 3, and with reference to only one safety rod 46b, although it will be understood that a reactor usually has a plurality of rods 46b. If it is desired to shut down the neutronic reactor, an effort is first made to insert the safety rod 46b into the active portion 20 of the reactor. If the safety rod 46b fails to enter the active portion 20 of the reactor for any reason whatever, then the trap doors 88 and 90 are lowered by rotation of the pins 92 and 94, thereby permitting the balls 72 to flow through the chutes 80 and 82 past the spiral fins 84, which prevent the balls 72 from jamming in the channel 42, and into the active portion 20 of the reactor through the channel 42. Once in the active portion 20 of the reactor, the balls 72 perform the same function that the safety rod 46b would have performed had it entered the active portion 20 of the reactor. The balls 72 may be removed from the active portion 20 of the reactor by any means whatsoever. One method of removing the balls from the reactor would be to provide an exit at the bottom of the channel 42 and remove the balls therethrough, such as plugged ducts 117 illustrated in FIG. 1.

Most unsafe conditions which require the operation of a reactor safety system require prompt attention, and the jamming of the safety rod 46b must result in the opening of the doors 88 and 90 in a minimum of time. It is therefore desirable to have an automatic device which opens the trap doors 88 and 90 in the event that the safety rod 46b fails to enter the reactor active portion 20. An electrical device for accomplishing automatic actuation of the trap doors 88 and 90 is shown schematically in FIG. 14 and will be described hereinafter.

In a particular embodiment of the invention, the cube 24 of graphite and reflector 22 are constructed of graphite having a diffusion length for thermal neutrons of approximately 50 centimeters and measuring overall 36 feet by 36 feet by 28 feet high. Tubes 30 are constructed of aluminum and spaced eight and three-eighths inches apart, the tubes extending through the active portion 20 and reflector 22 of the reactor parallel to each other and parallel to four of the sides of the reactor. The reflector 22 is approximately two feet thick in all directions, the portions of the reflector being traversed by the tubes 30 as well as all other portions of the reflector containing no fissionable material.

The fuel elements 26 of the reactor contain natural uranium disposed within cylindrical jackets approximately 0.028 inch thick and having an outside diameter of approximately 1.440 inches, the inside diameter of the tubes 30 being approximately 1.611 inches, thus leaving an annular space for flow of water coolant that is approximately 0.086 inch wide. The reactor may be operated at a power level of 250,000 kw., in which case the flow of water through the cooling annulus of each tube is about 19.5 feet per second, the water entering the reactor at a temperature of approximately 20° C. and being discharged from the reactor at a temperature of approximately 70° C. The thickness of the aluminum tubes 30 is approximately 0.059 inch, the outside diameter of the aluminum tube 30 being approximately 1.729 inches. All in all, the reactor is provided with 2,004 cooling tubes, the 1,500 cooling tubes centrally located within the graphite cube 24 at a minimum being filled with fuel elements 26, thus forming essentially a cylindrical active portion. This corresponds to a loading of about 200 short tons of natural uranium.

The reactor is provided with twenty-nine safety rods 46b which are held in a releasable manner above the active portion 20 of the reactor and which drop into the reactor active portion 20 in two to two and one-half seconds after being released. The portions of the safety rods 46b beneath the shield when the rods are fully inserted are in the form of hollow steel tubes containing one and one-half percent boron and have a diameter of two and one-half inches, a length of thirty-five feet, and a wall thickness of three-sixteenths inch. The sleeves 50 within the channels are constructed of aluminum and have an inner diameter just slightly larger than the diameter of the safety rods 46b. The vertical channels 42 for the safety rods 46b traverse the center volume of the active portion 20 of the reactor and are essentially equally spaced.

The balls 72 may be constructed of any material having a neutron capture cross-section of at least one hundred barns. Boron, cadmium, gadolinium and xenon have suitable neutron capture cross-sections and can be fabricated into the form of a ball. In the particular embodiment described the balls 72 have a diameter of three-eighth inch plus or minus 0.010 inch. The surface of the balls is coated with a 0.0002 inch thick coating of nickel. The balls themselves contain the following composition:

| Elements | % |
| --- | --- |
| Carbon | 0.055–0.075 |
| Manganese | 0.20 maximum |
| Silicon | 0.50–0.70 |
| Phosphorus and sulphur | 0.025 maximum |
| Boron | 1.0–1.70 |
| Iron | remainder |

There should be enough balls 72 disposed in each hopper 48 to provide an equivalent amount of boron in the reactor to that which would be disposed in the active portion of the reactor 20 if the safety rod 46b associated with the hopper were positioned within the active portion 20 of the reactor.

In the particular construction of the reactor here described, nine horizontal regulating and shim rods have been provided and are positioned to slide into the central portion of the active portion 20 of the reactor. These rods are equally spaced and contain materials having neutron capture cross-sections of at least one hundred barns, such as boron, cadmium and gadolinium. The safety rods 46b described above contain suitable proportions of boron for use as regulating rods 46a or shim rods 46c.

Figure 13:
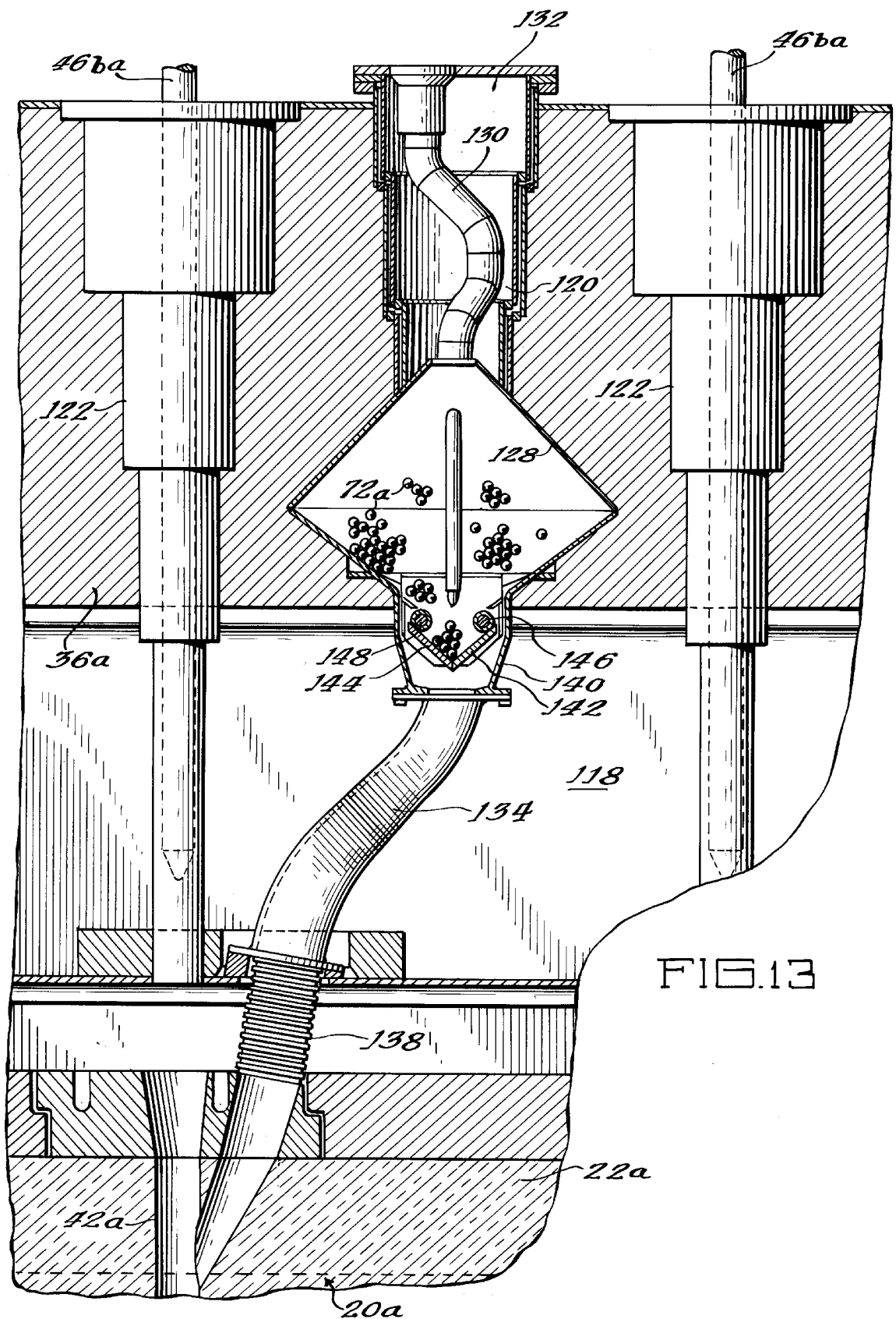
FIG. 13 is a vertical sectional view taken along line 13—13 of FIG. 12.

A second embodiment of the invention is shown in FIGS. 12 and 13 and is a modification of the reactor shown in FIGS. 1 through 11. In this modification, the container for the neutron-absorbing balls is disposed within the shield of the reactor itself, rather than being mounted above the reactor as shown in the first embodiment. The reactor is otherwise constructed in a manner similar with that described above. Elements which correspond to elements of the first embodiment will bear the same reference numeral as used in the first embodiment followed by the latter "a" to indicate a different embodiment.

In this embodiment, the shield 36a may be constructed in the manner of the shield 36 shown in the first embodiment. The shield 36a is supported by I beams 118 which extend across the top of the neutronic reactor. A cavity 120 is provided in the shield 36a and extends between a pair of adjacent I beams 118. The cavity 120 is also disposed centrally between a pair of safety rod channels 42a. Safety rods 46ba are translatably disposed within the channels 42a, and the openings of the channels 42a in the shield 36a are closed by plugs 122 of shielding materials.

The vertical channels 42a extend into the active portion 20a of the reactor. The active portion 20a, as stated above, is constructed in an identical manner with the active portion 20 of the reactor previously described.

A hopper 128 is disposed within the cavity 120 in the shield 36a. A duct 130 extends from the opening in the shield 36a for the cavity 120 to the hopper 128 through a plug 132 of shielding materials, the shielding materials having been omitted for clarity in FIGS. 12 and 13. The plug 132 is tapered in steps and conforms to the surfaces of the cavity 120, thereby reducing the amount of irradiation escaping therethrough. A pair of tubes 134 and 136 are attached to the bottom of the hopper 128 and extend to the vertical channel 42a at a point within the reflector 22a of the reactor just below the junction of the shield 36a therewith. The two tubes 134 and 136 merge at a point within the shield 36a just above the reflector 22a of the reactor, and a bellows 138 is provided between the point of merger and the vertical channel 42a.

As shown in FIGS. 12 and 13, the hopper 128 is provided with a recess 140 at the bottom thereof. A pair of rotating doors 142 and 144 are mounted upon pins 146 and 148 and form a V-shaped trough within the recess 140. The pins 146 and 148 are rotatable and coupled to rod 150 and coupling arms 154, the rod 150 extending upwardly through the shield 36a of the reactor. Translation of the rod 150 opens the doors 142 and 144.

As in the case of the first embodiment, the neutronic reactor may be shut down if one of the safety rods 46ba fails to enter into the active portion 20a of the reactor by opening the trap doors 142 and 144. Neutron-absorbing balls 72a which are disposed within the hopper 128 will then roll through the tubes 134 and 136 into the vertical channel 429 and become disposed within the active portion 20a of the reactor. The balls 72a are constructed with materials having neutron capture cross-sections of at least one hundred barns, as in the case of the balls 72 in the first embodiment, and therefore reduce the reactivity of the reactor when disposed within the active portion 20a of the reactor.

As previously stated, it is desirable to release the neutron-absorbing balls 72 or 72a automatically if the safety rod 46b or 46ba fails to enter the active portion 20 or 20a of the reactor. For this purpose, the embodiment of FIGS. 1 through 11 is provided with a coil 158 disposed within the inner wall 70 of the hopper 48. It is, of course, clear that this structure could be incorporated into the embodiment of FIGS. 12 and 13. The safety rod 46b is provided with means for providing a magnetic field, illustrated as magnet 160, inserted therein in a portion of the rod 46b which is disposed in the region of the shield 36 when the rod 46b is inserted into the reactor.

When the rod 46b enters the active portion 20 of the reactor, the magnet 160 passes through the coil 158 at a sufficient velocity to create an electric pulse in the coil 158. This pulse may be used to prevent the doors 88 and 90 of the hopper 48 from opening and releasing the neutron-absorbing balls 72 into the channel 28 of the reactor active portion 20.

Figure 14:
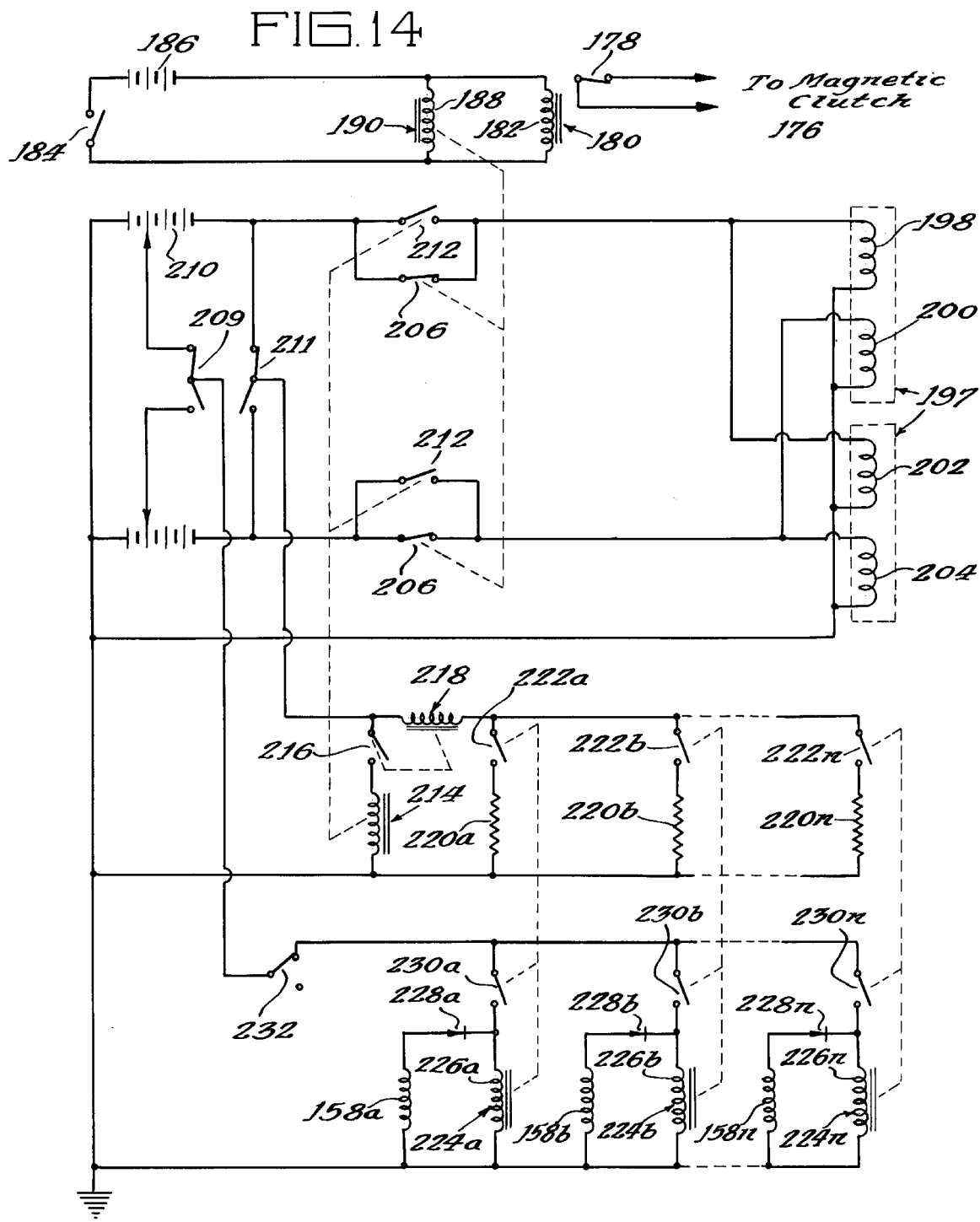
FIG. 14 is a schematic diagram illustrating the electrical system for controlling the safety systems shown in FIGS. 1 through 13.

The electrical circuit used to open the doors 88 and 90 of the hoppers 48 is shown in FIG. 14. It is to be understood that the circuit shown in FIG. 14 is for control of a single hopper of the reactor and that duplicate circuits must be arranged for the other hoppers or the control coils of the hoppers may be connected in parallel. As illustrated in FIG. 1, the safety rods 46b are suspended from a winch 170 mounted above the reactor by means of double cables 53, the winch 170 having two portions winding in opposite directions. A motor 174 is coupled to the winch 170 through a magnetic clutch 176. The magnetic clutch 176 requires an electric current to be flowing through the coils thereof in order to maintain coupling between the motor 174 and the winch 170. When the electrical power is removed from the magnetic clutch 176, the winch 170 is free to rotate and the safety rods 46b are free to fall into the active portion of the reactor.

As shown in FIG. 14, the power to the magnetic clutch 176 passes through the contacts 178 of relay 180 which maintains the contacts 178 in a closed position in the absence of power being applied to the relay coil 182. The coil 182 of the relay 180 is connected in a series circuit with a switch 184 and a source of power 186. When the switch 184 is closed, the relay 180 opens its contacts 178 permitting the safety rods 46b to fall into the reactor. The coil 188 of relay 190 is connected in parallel with the coil 182 of relay 180, so that closing switch 184 also actuates the relay 190. The relay 190 is used to control the trap doors of the ball hoppers 48, as will hereinafter be described.

Figure 2:
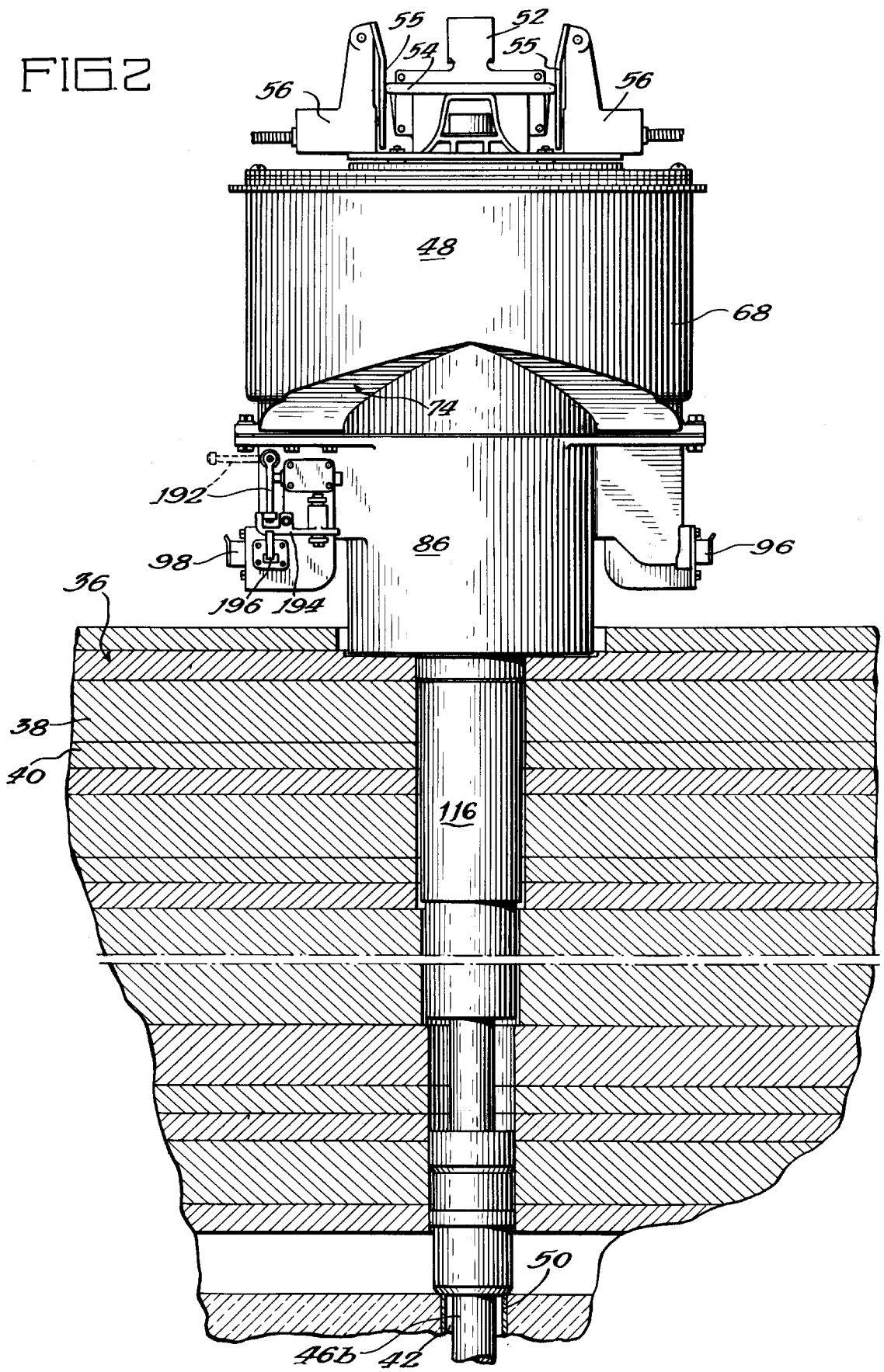
FIG. 2 is a vertical sectional view, partly in elevation, showing a portion of the safety system shown in FIG. 1 in enlarged form.
Figure 5:
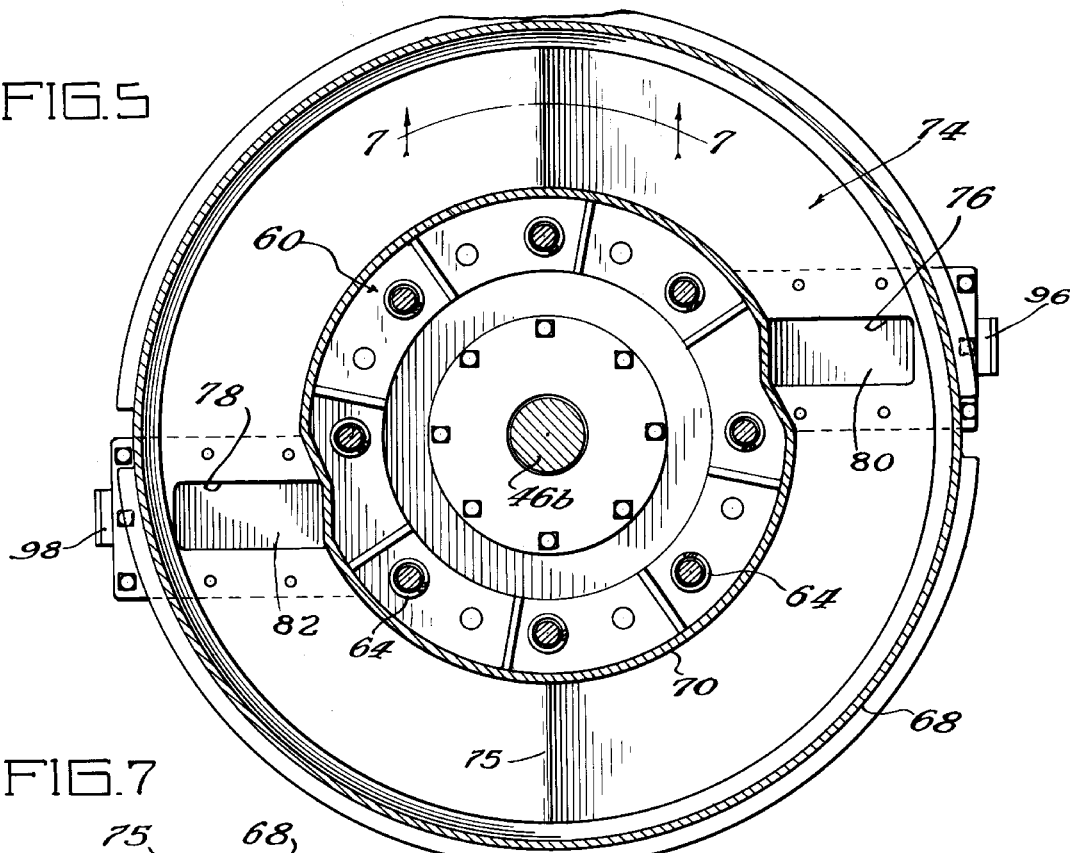
FIG. 5 is a horizontal sectional view taken along line 5—5 of FIG. 3.
Figure 7:
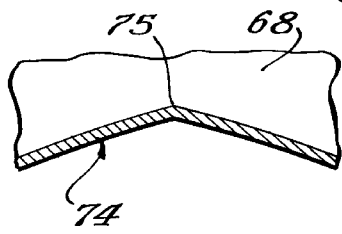
FIG. 7 is a sectional view taken along line 7—7 of FIG. 5.
Figure 6:
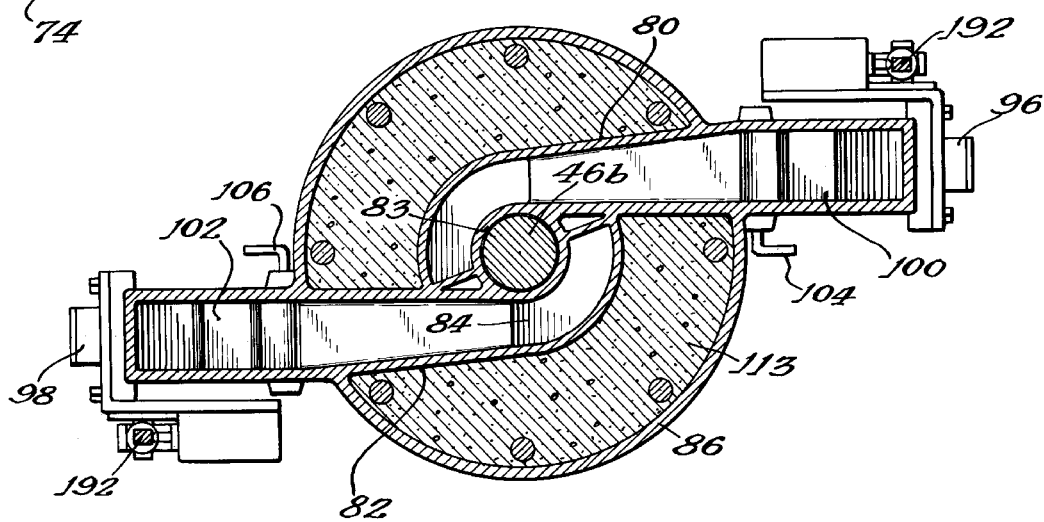
FIG. 6 is a horizontal sectional view taken along line 6—6 of FIG. 3.

FIG. 2 shows that the trap doors 88 and 90 of the hopper 48 are attached to arms 192 by means of pins 92 and 94, respectively. When the arms 192 are secured in position by means of clamps 194, the trap doors 88 and 90 are in the closed position. The clamps 194 are maintained in position by locks 196 which are the movable elements of an electromagnetic relay 197. The coils 198 and 202 of relay 197 are shown in FIG. 14. If power through the coils 198 or 202 of the relay fails, then the lock 196 will permit the clamp 194 to pivot outwardly releasing the arm 192 and opening the trap doors 88 and 90.

Relay 190 is a time delay relay, the period of time delay being slightly longer than the time required for the rods 46b to enter into and stop within the active portion 20 of the reactor. The relay 190 has a pair of switch contacts 206 connected in series with the coil 198 of relay 197 and a second pair of switch contacts 206 connected in series with the coil 204 of the relay 197. Relay 197 is illustrated as a double relay, coils 198 and 202 forming one complete relay circuit and coils 200 and 204 forming a second. The purpose of the dual nature of relay 197 and its associated circuit is to assure trouble-free operation of the reactor, even if one set of coils becomes faulty. Switches 209 and 211 select which of the two circuits is to be used. The source of power 210 which actuates the coils 198 and 202 flows through the switch 206 of relay 190 so that opening of the contacts 206 will release the balls 72 in the hopper 48 in the absence of other mechanism.

The release of the balls 72 in the hopper 48 is prevented by means of the actuation of relay 214 which has switch contacts 212 connected in parallel with the switch contacts 212 connected in parallel with the switch contacts 206 of relay 190, the relay 214 being actuated within the period of time delay of relay 190. The relay 214 is connected across the source of power 210 through contacts 216 of relay 218, so that relay 214 closes contacts 212 upon actuation of relay 218. Relay 218 is a current sensitive relay and is connected to the source of power 210 in series with a plurality of parallel-connected resistors 220a, 220b . . . 220n through switch contacts 221a, 222b . . . 222n, where n is the number of switch contacts, there being one set of switch contacts and resistor for each safety rod 46b of the reactor. The switch contacts 222a, 222b . . . 222n are the contacts of relays 224a, 224b . . . 224n. Each of the relays 224a, 224b . . . 224n has a coil 226a, 226b . . . 226n which is connected in a series circuit with coils 158a, 158b . . . 158n and rectifiers 228a, 228b . . . 228n. The relays 224a, 224b . . . 224n are also provided with switch contacts 230a, 230b . . . 230n, the switch contacts 230a, 230b . . . 230n being connected in a series circuit with the source of power 210 and the coils 226a, 226b . . . 226n of the relays 224a, 224b . . . 224n.

When the switch 184 is closed releasing the safety rods 46b, the rods 46b fall into the reactor causing magnets 160 to traverse the coils 158a, 158b . . . 158n, as best illustrated in FIG. 3. As a result, pulses are set up in the relays 224a, 224b . . . 224n unless one or more of the safety rods 46b fails to fall sufficiently far into the active portion 20 of the reactor. All of the relays 224a, 224b . . . 224n which receive a pulse are actuated to close contacts 230a, 230b . . . 230n and 222a, 222b . . . 222n. The closing of contacts 230a, 230b . . . 230n places a sealing voltage on the relays 224a, 224b . . . 224n which have closed, thereby preventing these relays from reopening. A reset switch 232 is connected in series with the source of power 210 and the switch contacts 230a, 230b . . . 230n in order to reopen relays 224a, 224b . . . 224n also closes switch contacts 222a, 222b . . . 222n. As a result of the closing of these contacts, sufficient current will flow through relay 218 to actuate this relay, and subsequently actuate relay 214. Unless a sufficient number of contacts 222a, 222b . . . 222n close, sufficient current will not flow through relay 218 to close contacts 216 and prevent the release of the balls 72 in the hopper 48. This is the desired result, since failure of a sufficient number of safety rods 46b to enter the reactor could prevent the stopping of the neutronic chain reaction in the absence of the release of the balls 72.

From the foregoing disclosure, the man skilled in the art will readily devise many other devices and modifications similar in nature to those disclosed herein. Hence, it is intended that the scope of the present invention not be limited to the specific device here disclosed, but rather only by the appended claims.

What is claimed is:

1. A neutronic reactor comprising an active portion containing material fissionable by neutrons of thermal energy, a shield surrounding the active portion of the reactor, means to control a neutronic chain reaction within the reactor, comprising a safety device and a regulating device, the safety device including means defining a vertical channel extending into the reactor from an aperture in the shield, a rod containing neutron-absorbing material slidably disposed within the channel, and means to introduce bodies of neutron-absorbing materials into the channel comprising a hopper having a hollow sleeve disposed within the channel and extending through the aperture in the shield, a spiral fin disposed about the sleeve in the portion of the channel extending through the shield, said hopper having an inner and outer wall defining a compartment adapted to contain bodies of neutron-absorbing materials, a floor disposed between said inner and outer walls and a door disposed within the floor opening into the portion of the channel containing the spiraled fins.

2. A neutronic reactor comprising an active portion containing material fissionable by neutrons of thermal energy, means to control a neutronic chain reaction within the reactor comprising a safety device and a regulating device, the safety device including means defining a vertical channel extending into the reactor from an aperture in the upper surface of the reactor, a rod containing neutron-absorbing materials slidably disposed within the channel, means for maintaining the safety rod in a withdrawn position relative to the active portion of the reactor including means for releasing said rod on actuation thereof, a hopper mounted on a level above the aperture in the reactor having a door disposed at the bottom of the hopper opening into the vertical channel, a plurality of bodies of neutron-absorbing materials disposed within the hopper, and means responsive to the failure of the safety rod on actuation thereof to enter the active portion of the reactor for opening the door in the hopper.

3. A neutronic reactor comprising the elements of claim 2 wherein the regulating device comprises a rod containing neutron-absorbing materials translatably disposed at least partially within the active portion of the reactor.

4. A neutronic reactor comprising an active portion containing material fissionable by neutrons of thermal energy, means to control a neutronic chain reaction within the reactor comprising a safety device and a regulating device, the safety device including means defining a vertical channel extending into the reactor from an aperture in the upper surface of the reactor, a rod containing neutron-absorbing materials slidably disposed within the channel, means for maintaining the safety rod in a withdrawn position relative to the active portion of the reactor including an electromagnetic clutch for releasing said rod on deactuation thereof, a hopper mounted on a level above the active portion of the reactor having a door disposed at the bottom of the hopper opening into the channel, a plurality of bodies of neutron-absorbing materials disposed within the hopper, and means responsive to the failure of the safety rod on deactuation of the clutch to enter the active portion of the reactor for opening the door in the hopper.

5. A neutronic reactor comprising the elements of claim 2 wherein the means responsive to the failure of the safety rod on actuation thereof to enter the active portion of the reactor for opening the door in the hopper comprise a section of magnetized magnetic material disposed within a safety rod at a point within the shield of the reactor when the rod is fully inserted into the reactor, a coil of wire disposed about the channel adjacent to the shield of the reactor above the aperture therein, electrical means for releasing the safety rod and opening the door in the hopper including means to interject a time delay between actuation and opening of the door in the hopper, and means responsive to the generation of a pulse in the coil resulting from the release of the safety rod for preventing the opening of the door in the hopper.

6. A neutronic reactor comprising the elements of claim 4 wherein said hopper is embedded within the shield of the reactor.

7. A neutronic reactor comprising the elements of claim 4 wherein the hopper is mounted above the shield of the reactor.

8. A neutronic reactor comprising an active portion containing material fissionable by neutrons of thermal energy, means to control a neutronic chain reaction within the reactor comprising a safety device and a regulating device, a safety device including means defining a vertical channel extending into the reactor from an aperture in the upper surface of the reactor, a rod containing neutron-absorbing materials slidably disposed within the channel, means for maintaining the safety rod in a withdrawn position relative to the active portion of the reactor including means for releasing said rod on actuation thereof, a hopper mounted above the active portion of the reactor having a door disposed at the bottom of the hopper opening into the vertical channel, a plurality of bodies of neutron-absorbing materials disposed within the hopper, and means responsive to the failure of the safety rod on actuation thereof to enter the active portion of the reactor for opening the door in the hopper.

\* \* \* \* \*